United States Patent [19]

Yanai

[11] Patent Number: 5,009,740

[45] Date of Patent: Apr. 23, 1991

[54] BAG MAKING MACHINE

[75] Inventor: Takeo Yanai, Koshiga Ya-C, Japan

[73] Assignee: Nippon Flute Co., Ltd., Irumagun, Japan

[21] Appl. No.: 391,259

[22] Filed: Aug. 9, 1989

[51] Int. Cl.[5] .......................... B32B 31/00; B26D 5/20

[52] U.S. Cl. .................................... 156/353; 156/361; 156/366; 156/515; 493/194; 493/203; 83/210

[58] Field of Search ................................ 156/353-355, 156/361, 366, 515, 251; 83/209, 210, 367, 72, 171; 493/194, 203; 226/32, 33, 45; 53/51, 75

[56] References Cited

U.S. PATENT DOCUMENTS

| | | | |
|---|---|---|---|
| 3,902,954 | 9/1975 | Lotto | 156/410 X |
| 4,011,975 | 3/1977 | Brown | 226/33 X |
| 4,047,992 | 9/1977 | Williams | 156/366 X |
| 4,077,306 | 3/1978 | Wech | 493/193 X |
| 4,101,363 | 7/1978 | Lotto | 156/38.4 X |
| 4,128,985 | 12/1978 | Simmons | 53/51 |
| 4,131,503 | 12/1978 | Plate | 493/203 X |
| 4,737,904 | 4/1988 | Ominato | 83/72 X |
| 4,854,928 | 8/1989 | Fukuyama | 493/194 X |

*Primary Examiner*—David A. Simmons
*Assistant Examiner*—Chester T. Barry
*Attorney, Agent, or Firm*—Bradford E. Kile

[57] ABSTRACT

A machine including a control system having a timer for producing bags made from thermoplastic resin films of varying thickness. A pair of feed rollers intermittently feeds a continuous flat tubular web of thermoplastic resin between an upper heat sealing bar and a lower sealing surface. The sealing bar, which approaches but does not contact the web, is heated to effect a weld bead on the web, a cutting edge severs the web adjacent the bead, and the feed rollers advance the web as the sealing bar and cutting edge are withdrawn. A sequencer provides timed control of a motor that operates the rollers and another motor that operates the sealing bar and cutting edge.

8 Claims, 6 Drawing Sheets

BAG MAKING MACHINE

BACKGROUND OF THE INVENTION

This invention relates to a novel bag making machine for producing thermoplastic resin film bags. More specifically, this invention relates to a machine for making bags and a control system which includes a timer for operably controlling production of bags made from thermoplastic resin films of varying thickness.

Thermoplastic resin bags, such as those used in supermarkets, convenience stores, etc. are produced from a long tubular web of thermoplastic synthetic resin film. The tubular web, which is unrolled from a spool, is intermittently fed into a bag making machine where heat is transversely applied to the web in order to form a weld seal between the two layers of the web. A cutting edge intersects and transversely severs the web adjacent to the seal in order to complete formation of a bag.

A common configuration for achieving the above mentioned sequence of operations includes platen rollers which intermittently draw a web of thermoplastic resin film into the bag making machine. Upon cessation of advancement of the web, a sealing mechanism, which includes a fixed lower seal surface and a heated upper reciprocating seal bar, engage and melt the top and bottom layers of the web together. A weld bead seal is formed when the web cools.

The sealing surfaces are coated with an anti-adhesive material, such as Teflon, in order to prevent the weld bead seal of the thermoplastic web from adhering to the seal bars. Associated with the upper reciprocating seal bar is a cutting edge which transversely severs the thermoplastic web adjacent to the weld bead. Platen rollers then advance the web the length of a bag in order to repeat the sealing and severing cycle.

There are various desirable configurations of bags and an accompanying variety in the thickness of the thermoplastic resin film which forms a bag. The thickness of the thermoplastic resin films may range between 0.01 and 0.2 millimeters. This relatively wide range of thicknesses necessitates differing time periods during which the sealing bar melts the bag so that a weld bead of high structural seal integrity may be formed.

One previously known bag making machine assembly includes a single motor which drives both the sealing and severing means and the platen rollers, which advance the web. The constant speed of rotation of the motor alternately drives the advancement rollers and the heat sealing and cutting mechanism. A clutch, brake, and crank assembly effect the alternating operation of the advancement and sealing and severing operations. In order to lengthen the amount of time that the sealing bar applies heat to the web, a cam connected to the assembly can be adjusted, thereby altering the duration of the sealing operation. However, adjustment of the cam assembly is time consuming and an ineffective method of varying seal time. Increasing the sealing time requires that the speed of rotation of the motor is slowed. As a result, the platen rollers, which are also responsive to this single motor, advance the web at a slower rate, thus decreasing machine efficiency. The speed of rotation of the motor limits the rate of advancement of the thermoplastic resin film, thereby adversely affecting overall machine efficiency.

The difficulties suggested in the preceeding are not intended to be exhaustive but rather are among many which may tend to reduce the efficiency of bag making machines when presented with varying thicknesses of thermoplastic resin film. Other noteworthy problems may also exist; however, those presented above should be sufficient to demonstrate that bag making machines appearing in the past will admit to worthwhile improvement.

OBJECTS and BRIEF SUMMARY OF THE INVENTION

Objects

It is therefore a general object of the invention to provide a novel bag making machine which will obviate or minimize difficulties of the type previously described.

It is a specific object of the invention to provide a bag making machine which will permit a weld bead of high seal integrity to be imparted to thermoplastic resin films of varying thicknesses.

It is another object of the invention to provide a bag making machine which will enhance machine efficiency.

It is still another object of the invention to provide a bag making machine which will optimize the timed interaction of a sealing and severing operation and web advancement.

It is yet still another object of the invention to provide a bag making machine of enhanced cycle time and concomitant bag production for a variety of web thicknesses.

Brief Summary of a Preferred Embodiment of the Invention

A preferred embodiment of the invention which is intended to accomplish at least some of the foregoing objects includes a pair of rollers for intermittently advancing a flat tubular web of thermoplastic film, which is commonly supplied on a spool. The pair of rollers includes a feed roller, positioned beneath and extending transversely across the tubular web, which is rotated by a first motor and thereby advances the web. A pressure roller lies directly above the feed roller and mutually extends across the web. The pressure roller passively rotates with the feed roller to intermittently draw the web from the spool.

Two layers of the tubular web are sealed together by a sealing means, which includes a heated upper seal bar and a lower surface positioned beneath the heated upper seal bar. The thermoplastic web operably lies between the heated upper seal bar and the lower surface. Upon lowering of the heated upper seal bar to a position adjacent to but spaced from the lower surface, the interposed thermoplastic web melts and a weld bead seal is formed.

A cutting edge associated with the heated upper seal bar transversely severs the tubular web adjacent to and substantially parallel with the weld bead seal, thereby dividing the web into two portions. During machine operation, the thermoplastic web is advanced toward the sealing means by the feed and pressure rollers the desired length of a bag, while the sealing and severing means are withdrawn from the web. Following web advancement, the sealing and severing means vertically approaches and contacts the web. The web is sealed and severed and is then advanced the length of a bag to be formed.

A first motor controllably drives the feed roller so that the web may be advanced to the appropriate position for sealing and severing. A second motor drives the sealing and severing means vertically toward and away from the tubular web of thermoplastic resin film when the tubular web dwells at a sealing and cutting station.

Machine operation and interaction of the various components of the bag making machine are directed by a control assembly, which include a timer and a sequencer. The timer controls the amount of time that the heated upper seal bar is in contact with the tubular web so that a full weld bead may be imparted to webs of varying thicknesses. The speed of the second motor is responsive to the timer. The speed of the first motor is continuous and allows for rapid advancement of the web regardless of the rate of actuation of the second motor.

The sequencer controls the timed interaction of the first and second motors so that when the web is being advanced to a position suitable for sealing and severing, the heated upper seal bar and the cutting edge are vertically withdrawn from the web. When the web is no longer being advanced, the sealing and severing operations commence with the vertical advancement of the heated upper seal bar and the cutting edge toward the lower surface.

THE DRAWINGS

Other objects and advantages of the present invention will become apparent from the following detailed description of a preferred embodiment thereof taken in conjunction with the accompanying drawings, wherein.

DETAILED DESCRIPTION

Figure 1:
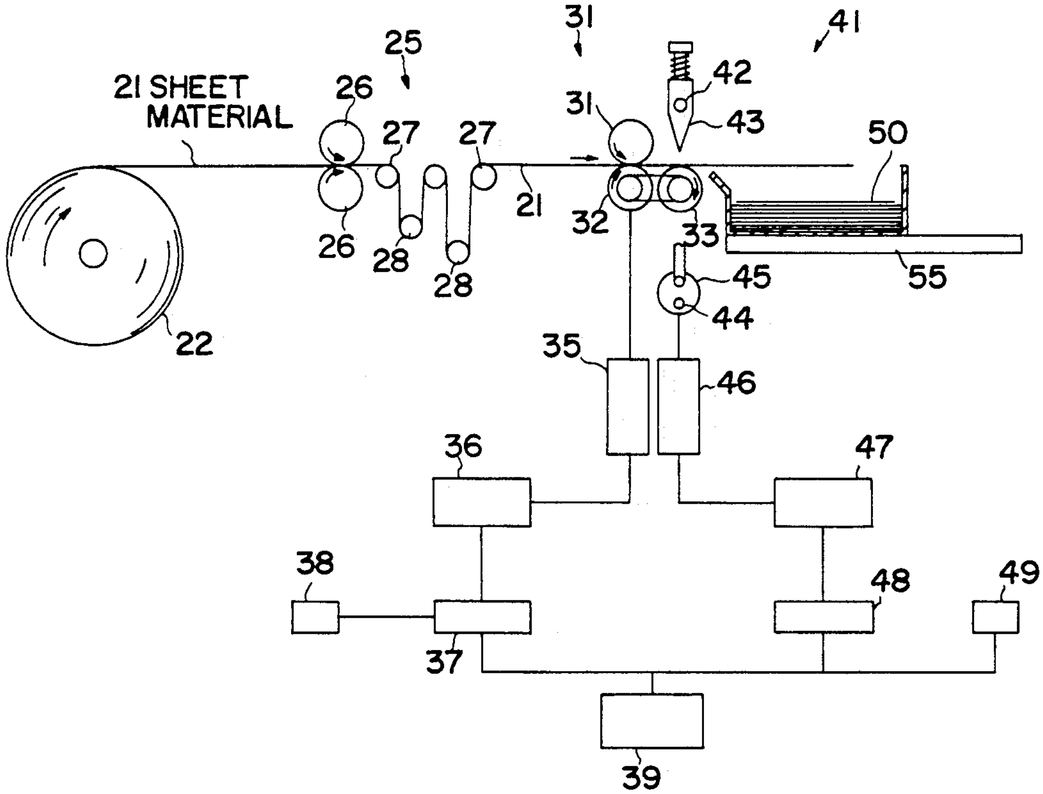
FIG. 1 is a schematic illustration of the subject invention and depicts a bag making machine and an associated control assembly in accordance with a preferred embodiment of the invention.

Referring now to the drawings, wherein like numerals indicate like parts, and initially to FIG. 1, there will be seen a schematic view of the subject invention. More particularly, a tubular web of thermoplastic resin film 21, drawn from a spool 22, is shown positioned in a bag making machine, which includes an associated control assembly. A feed assembly 31 intermittently advances the web 21 into a sealing and severing mechanism 41. Completed bags 50, of a predetermined length, are formed and are shown in a bundled posture on a stacking table 55 ready for packaging.

Returning now to the left side of FIG. 1, the tubular web of thermoplastic resin film 21 is drawn from the spool 22 by supply rollers 26 into a tension arm assembly 25. The tension arm assembly 25 insures that the web 21 is substantially taut upon entrance into the intermittent feed assembly 31. The feed assembly 31 includes a feed roller 32 and a pressure roller 34, which holds the web 21 for controlled movement. A first servo motor 35 drives the feed roller 32. A second servo motor 46 drives the sealing and severing mechanism 41. Connected to first 35 and second 46 servo motors is the control assembly, which includes a first servodriver 36, a second servodriver 47, a dimension setter 38, a first digital pack 37, a second digital pack 48, a sequencer 39, and a timer 49.

The intermittent feed assembly 31 sequentially advances the tubular web of thermoplastic resin film 21. The feed roller 32 is positioned below and extends transversely across the web 21 so that rotation of the feed roller 32 advances the web. The pressure roller 34 is positioned above the feed roller 32 and mutually extends transversely across the web 21 so that when the web lies between the rollers, the pressure roller 34 passively rotates with the feed roller 32 to advance the web 21. The feed roller 32 is intermittently driven, as directed by the control assembly, by the first servo motor 35 and rotates in the direction depicted in FIG. 1.

An interlocking roller 33 is connected to the feed roller 32 by a belt and rotates with the feed roller 32. The interlocking roller 33 is positioned beneath and extends transversely across the web 21. An upper seal bar 43 is heated by a heater 42 and is positioned above, mutually opposite to and in vertical alignment with the interlocking roller 33.

Figure 2A:
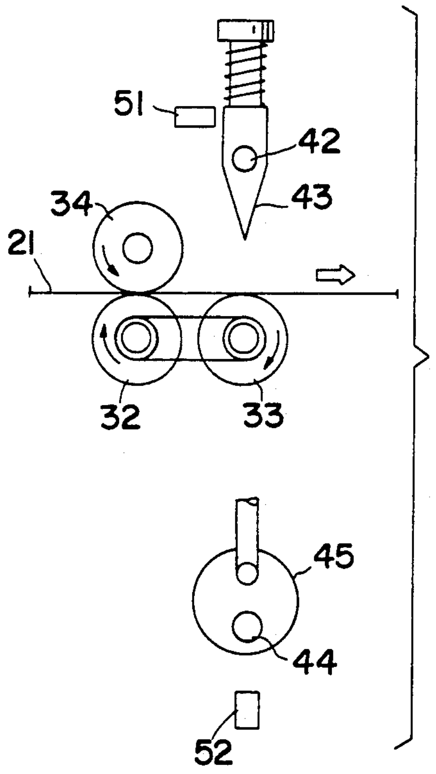
FIGS. 2A and 2B are side elevational views of the sealing and severing mechanisms and feed means as depicted in FIG. 1 for advancing a tubular web of thermoplastic resin film.

When the web 21 is being advanced by the feed 32 and the pressure 34 rollers as shown in FIG. 2(A), the upper seal bar 43 is vertically withdrawn from the web 21 so that heat that emanates from the upper seal bar 43 does not adversely affect the web 21. The sequencer 39 of the control assembly controls the intermittent rotation of the feed roller 32 via the digital pack 37. The sequencer 39 also controls reciprocation of the seal bar 43 and associated cutting edge. A cam assembly 45 actuates reciprocation of the upper seal bar 43 via shaft 44, which is driven by servo motor 35.

Figure 2B:
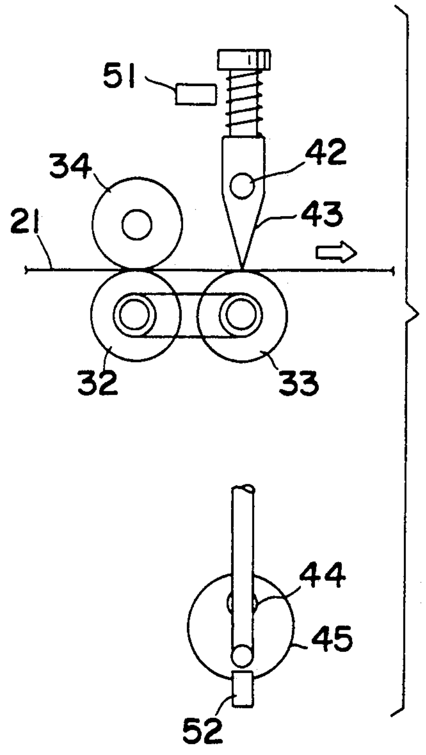

When the web 21 has been advanced a predetermined length of a bag, as defined by the dimension setter 38, the sequencer 39 commands interrupt of advancement of the web 21 by the feed 32 and pressure 34 rollers via first digital pack 37. As shown in FIG. 2(B), the upper seal bar 43 then vertically descends toward the web 21. The interlocking roller 33 stops rotating and the upper seal bar 43 is brought into intimate juxtaposition with the interlocking roller 33. Heat from the upper seal bar 43 melts the web 21, and upon cooling, a weld bead seal is formed. The amount of time that the upper seal bar 43 remains juxtaposed to the interlocking roller 33 is set by the timer 49 of the control. The timer 49, which is connected to both the sequencer 39 and the second digital pack 48, is adjusted according to the thickness of the web 21 to be sealed. For example, when the web 21 is thick, the timer 49 may be adjusted so that the sealing time is increased to adequately heat and seal the layers of the web 21 together.

In the embodiment of FIGS. 1, 2A and 2B, the slitting and the severing operations are performed by the upper seal bar 43, which has a sharp edge. When the upper seal bar 43 advances to the interlocking roller 33 it abuts the web 21 on the interlocking roller 33 to fuse and cut the web 21 by means of its relatively sharp edge. The upper seal bar 43 severs the web 21 adjacent to and substantially parallel with the weld seal bead, thereby dividing the web 21 into two portions.

Proximity switches 51 and 52 detect the upper and lower positions, respectively, of the upper seal bar 43. A vertically withdrawn position of the upper seal bar actuates sequential advancement of the web 21 by the control.

Figure 6:
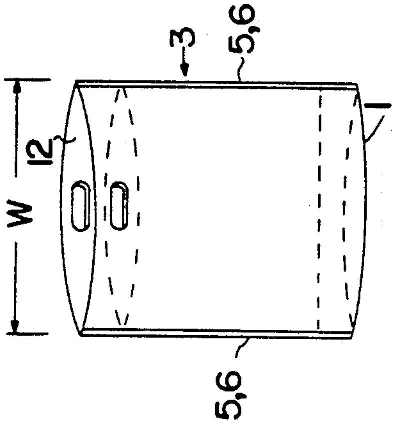
FIG. 6 illustrates a completed bag associated with the bag making machine detailed in FIG. 2.
Figure 7:
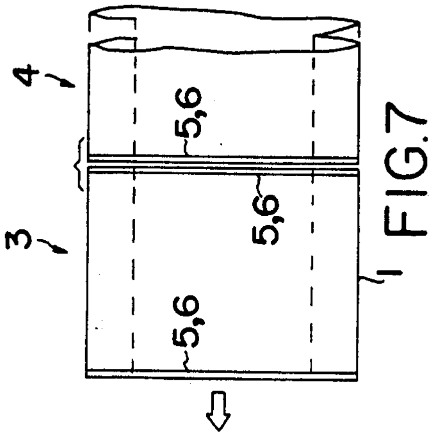
FIG. 7 depicts the configuration of a tubular web of thermoplastic resin film prior to its formation into a completed bag as shown in FIG. 6 and illustrates the positions where the web is sealed and severed.

As shown in FIG. 6, a completed bag 3 of predetermined width "W" has a bottom portion 1 which may be expanded and an upper portion 12 which operably opens to allow containment of goods. The completed bag 3 is formed from a sheet material 4 as shown in FIG. 7. In order to form the bag 3, the sheet material 4 is sealed and severed at 5 and 6 in order to produce a bag 3 of width W. The sheet material 4 enters the bag making machine in the direction of the arrow from a spool 22, and is already fused at a bottom end and is not fused at a top end. This permits the sheet material 4 to be formed into the bag 3 as shown in FIG. 6.

Referring again to FIG. 1, the supply rollers 26 are driven in the direction shown by the arrows by a motor (not shown) to draw the web 21 from the spool 22. The web then enters a tension arm assembly 25, which includes guide rollers 27 and tension rollers 28. The guide rollers 27 are positioned horizontally in a posture coplanar with and parallel to each other and extend transversely across the web 21. The tension rollers 28 are positioned vertically below and parallel to the guide roller 27. The tubular web operably loops through the guide 27 and tension 28 rollers. The tension rollers 28 are biased downward by a spring and move vertically depending upon the tension exerted upon them by the web 21. The motor (not shown) which drives the supply rollers 26 is controlled by the vertical position of the tension rollers 28.

When the web 21, advanced by the guide rollers 27 and tension rollers 28, is taut the tension roller 28 raises and the rotation speed of the motor is gradually increased to increase the rate of advancement of the web 21 by the supply rollers 28. When an excess amount of the web 21 is within the tension arm assembly 25 so that the web 21 is not taut upon entrance to the feed assembly 31, the tension rolls descend vertically. The rotation speed of the motor then decreases, and the rate of draw of the web 21 by the supply rollers 26 also decreases. The tension arm assembly encourages the web 21 to be substantially taut upon entrance to the feed assembly 31 so that the bags 50 will be substantially flat and properly formed.

Figure 3:
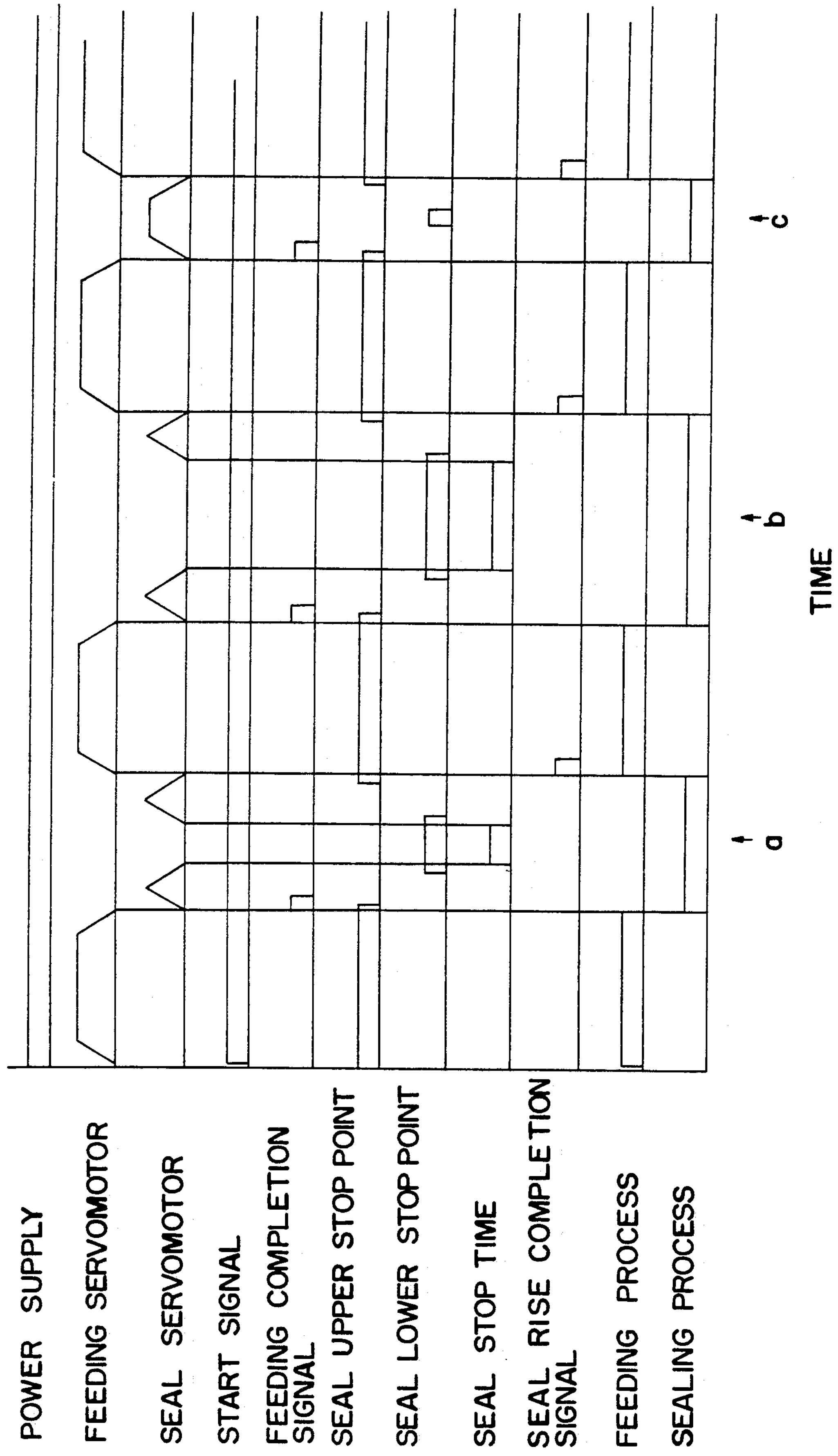
FIG. 3 illustrates the electrical signals associated with the controls and the timed response of various components of the bag making machine during operation.

Referring particularly to FIG. 3, shown is the timed relation of the bag making machine cycle signals as controlled by the sequencer 39. The abscissa is time, and the ordinate is the various labelled command signals. FIG. 3 shows the duration of particular electrical signals as controlled by the sequencer 39.

The portion on the graph labelled "a" illustrates a machine cycle where the sealing time of the upper seal bar 43 set by the timer 49 is relatively short compared to the sealing time of a machine cycle as shown at "b". The portion "c" shows a machine cycle where the sealing time of the upper seal bar 43 set by the timer 49 is zero (0) seconds.

The positions of the electrical signals are either high or low. The power supply is continuously high for all portions "a", "b", and "c" because the bag making machine is operating for these cycles. The feeding servomotor and the seal servomotor signals correspond to the first servomotor 35 and second servomotor 46, respectively. The feeding and seal servomotor signals gradually approach a high or low value because the motors are mechanically constrained from instantaneously reaching an optimum value, whereas the other signals on the graph are those in microprocessors and may reach a high or low state substantially instantaneously; thus, the remaining signals are square in shape.

A start signal actuates the feeding servomotor, which then approaches a high value, and the intermittent feeding mechanism 31 advances the web 21 the predetermined length of a bag 50 as signalled by the feeding completion signal. The feed completion signal is produced by the dimension setter 38. The seal servomotor is then actuated to advance the upper seal bar and an associated cutting edge toward the web 21. The seal dwell time is set by the timer 49 and controls the amount of time that the upper seal bar 43 remains juxtaposed to a lower seal surface. The upper seal bar 43 is withdrawn from the web 21 by the seal servomotor signal after the seal stop time signal goes to a low value.

The upper proximity switch 51 senses the positioning of the upper seal bar 43 and produces the seal upper stop point signal, which then actuates the feeding servomotor, as shown in FIG. 3. The sealing and severing cycle is then repeated. Also shown is the seal lower stop point signal, which indicates the descended positioning of the upper seal bar 43, as shown in portion "a". The seal lower stop point signal actuates integration of the seal stop time signal so that the upper seal bar 43 will remain juxtaposed with the lower surface.

The machine cycle operations of portions "a", "b", and "c" are similar, except that the seal stop time varies as controlled by the timer 49. The total time that the sealing process occurs, as shown by the sealing process signal, varies. The feeding process signal exists for a constant amount of time, as the feeding servomotor and the seal servomotor are rotating at independent speeds. A machine operator sets the timer 49 which actuates a seal stop time signal in accordance with the thickness of the web 21 to be sealed.

Figure 4A:
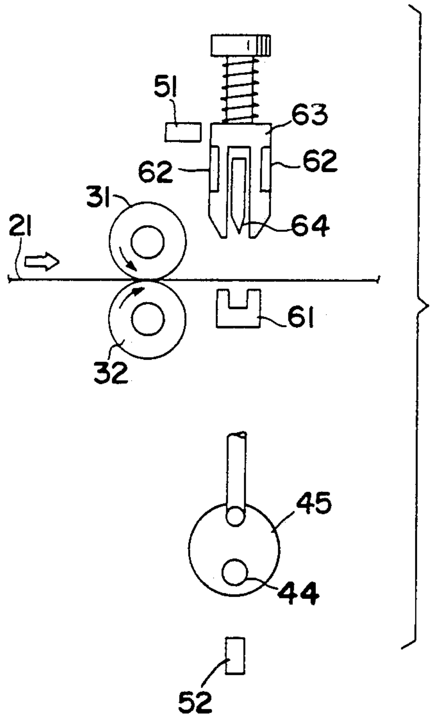
FIGS. 4A and 4B are side elevational views of an alternative configuration for sealing and severing mechanisms and depict the position of the sealing and severing members during both web advancement and a sealing and severing.

The bag making machine of the instant invention permits production of bags of various configurations. Alternative configurations of the sealing and severing mechanism 41 of FIG. 1 produce bags 51 of differing shapes, which may also necessitate a web 21 of a different thickness. Referring to FIG. 4(A), shown is a sealing and severing means which includes a U-shaped bar 61 positioned beneath and operably extending transversely across the web 21. The upper seal bar 63 includes two parallel legs positioned above and mutually opposite to upwardly extending legs of the U-shaped bar 61. The legs of the upper seal bar 63 are heated by heaters 62. A cutting edge 64 is positioned between and reciprocates with the legs of the upper seal bar 63. The upper seal bar 63 and associated cutting edge 64 are vertically withdrawn from the U-shaped bar 61 while the feed 32 and pressure 34 rollers advance the web 21, as shown.

Figure 4B:
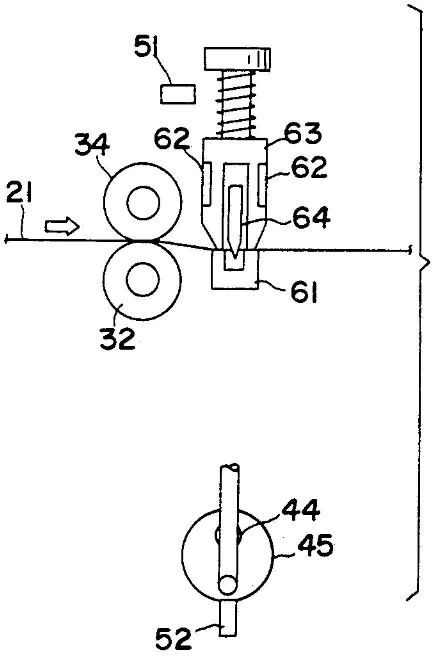

FIG. 4(B) illustrates the position of the upper seal bar 63 juxtaposed to the U-shaped bar 61. The weld bead seal is induced onto the web 21 by the heated legs of the upper seal bar 21, and the amount of time the upper seal bar induces the weld bead seal is controlled by the timer 49 of the control assembly. The cutting edge 64 descends and, severs the web 21 by entering into the U-shaped cavity in the U-shaped bar 61.

Figure 8:
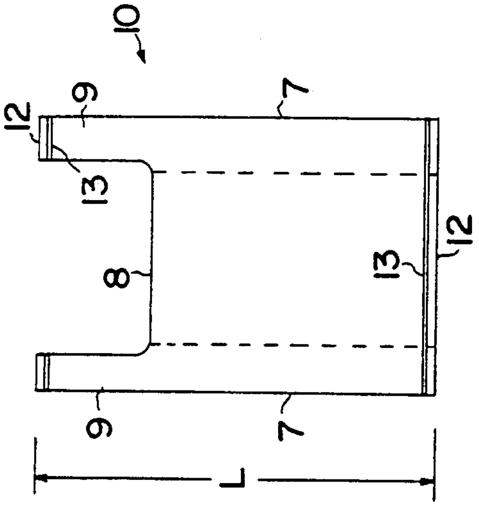
FIG. 8 illustrates another completed bag which is associated with the bag making machine detailed in FIG. 4.

The sealing and severing mechanism of FIGS. 4A and 4B produces a bag 10, commonly known as a "T-shirt" bag, of length L as shown in FIG. 8. The bag 10 has side portions 7 which are folded on the spool 22 and may widen to allow the bag to expand. Handles 9 permit a user to facilely grasp the bag on either side of an opening portion 8, which is produced in a manner not shown. Upper and lower sealed portions 13 are adjacent the cut portion 12 of a continuous web stock.

Figure 9:
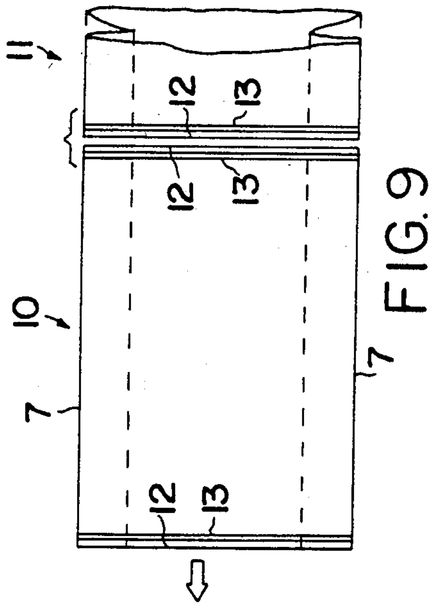
FIG. 9 depicts the configuration of a tubular web of thermoplastic resin film prior to its formation into the completed bag as shown in FIG. 8 and illustrates the locations where the web is sealed and severed.

FIG. 9 illustrates a web 11 which forms the bag 10 shown in FIG. 8. The web 11 is fed into the bag making machine in the direction shown by the arrow. The legs of he upper seal bar 63 produce the weld bead seals 12 and the web 11 is severed at 13 producing a kerf as shown. Severance of the web 11 separates a completed bag 10 and a sealed portion of one end of a next bag. The sealing time is again controlled by the timer 49 of the control assembly.

Figure 5B:
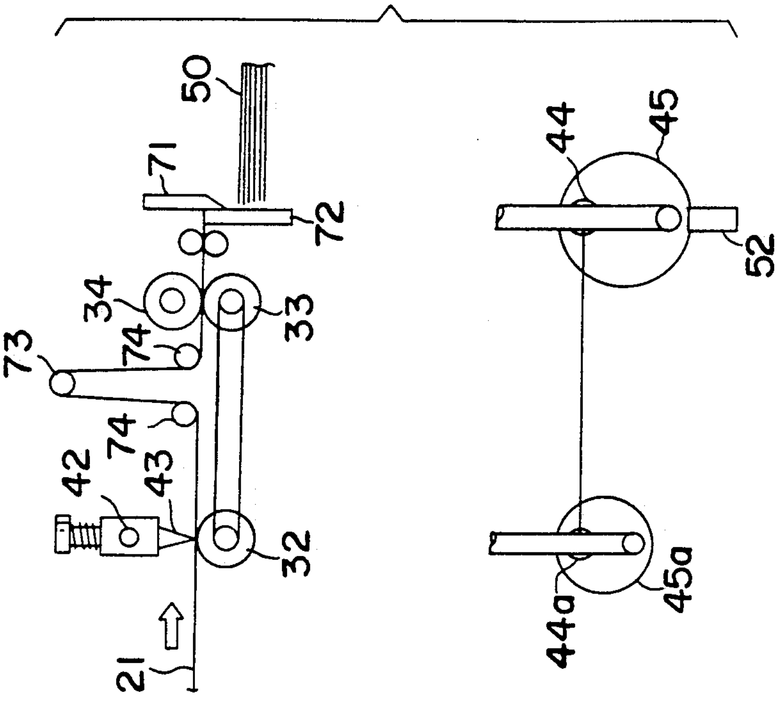
FIGS. 5A and 5B are side elevational views of an alternative configuration for sealing and severing a thermoplastic web.
Figure 5A:
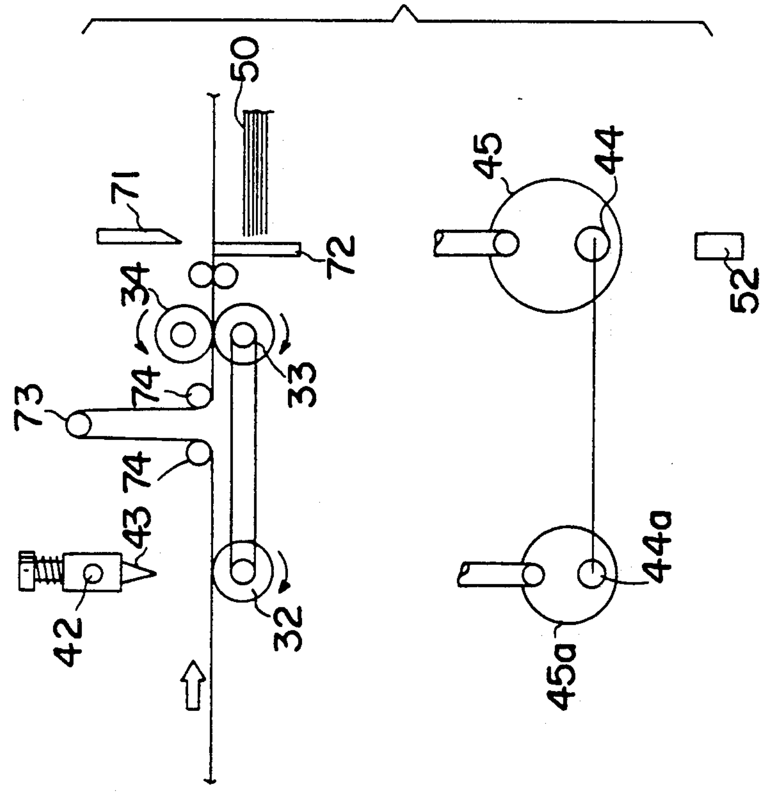

Referring to FIG. 5(A), there will be seen yet another preferred configuration for a sealing and severing assembly. More specifically, a seal bar 43 is heated by a heater 42 and is vertically positioned above an interlocking roller 32. The web 21 is advanced in the direction as shown by the arrow by the feed roller 33 and pressure roller 34, which rotate as shown. Guide rollers 74 are positioned horizontally in a posture coplanar with each other and extend transversely across the web 21 as described in relation to FIG. 1. A tension roller 73 vertically reciprocates and thereby controls the tautness of the web 21 as also described in relation to FIG. 1.

A cutting edge 71 and a cutting surface 72 are positioned at the distal end of the bag making machine. The cutting edge 71 reciprocates toward and away from the cutting surface 72 by actuation of the servomotor 46 via shaft 44 and cam assembly 45. The upper seal bar 43 is also driven by the servomotor 46 via a shaft *44a* and a cam assembly *45a*. The timer 49 controls the interaction of the two assemblies 45 and *45a*.

FIG. 5(A) illustrates the positioning of the upper seal bar 43 and the cutting edge 71 when the web 21 is being advanced in the direction shown by the arrow. FIG. 5(B) illustrates the position of the upper seal bar 43 and the cutting edge 71 when the web 21 is no longer being advanced and the sealing and severing operations are occurring.

Figure 10:
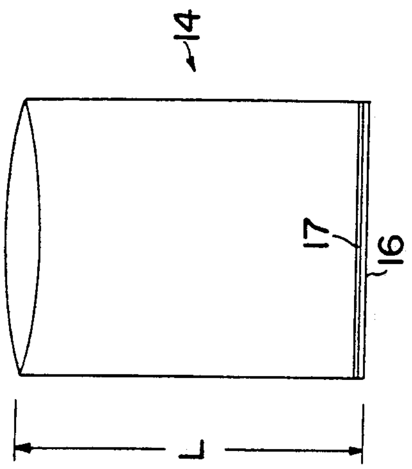
FIG. 10 illustrates yet another completed bag made from a tubular web of thermoplastic resin film.
Figure 11:
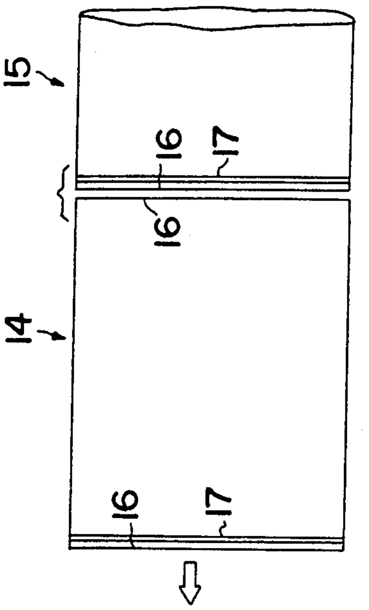
FIG. 11 depicts the configuration of a tubular web of thermoplastic resin film prior to its formation into the completed bag as shown in FIG. 10 and illustrates the locations where the web is sealed and severed by a bag making machine of the present invention.

Referring to FIG. 10, there is shown a bag 14 of length "L" having a sealed portion 17 severed at 16 and formed by a bag making machine schematically illustrated in FIGS. 5A and 5B. As shown in FIG. 11, the web 14 is fed into the bag making machine in the direction of the arrow where the sealed portion 17 is inducted on the web 14. The web 14 is then advanced and severed at 16 while a second portion of the web 15 is severed at 17 to begin formation of a second bag. This web 15 is then advanced, the web is severed at 16, and the second bag is formed.

SUMMARY OF MAJOR ADVANTAGES OF THE INVENTION

After reading and understanding the foregoing description of a preferred embodiment of the subject inventive bag making machine, in conjunction with the drawings, it will be appreciated that several distinct advantages of the subject invention are obtained.

Without attempting to set forth all of the desirable features of the instant bag making machine, at least some of the major advantages of the invention include the capability to produce bags with high weld integrity notwithstanding varying thicknesses of a thermoplastic resin film web being introduced into the bag making machine. Use of a first 35 and a second 46 servomotor which rotate at different speeds permits the feed assembly 31 and sealing and severing mechanism 41 to be actuated at different speeds.

The timer 49 of the control optimizes interaction of the feed assembly 31 and the sealing and severing mechanism 41. The subject invention makes it possible to set an optimum sealing time in accordance with the thickness and type of thermoplastic resin film used to form a bag. While the sealing time may vary, the rate of rotation of the first servomotor 35 remains constant and insures that the web 21 is fed into the sealing and severing mechanism 41 at a relatively rapid pace. The rate of advancement of the web 21 is independent of the rate of the sealing and severing operations. Machine efficiency is thereby optimized because the amount of time that the sealing and severing assemblies idle is minimized.

In describing the invention, reference has been made to preferred embodiments and illustrative advantages of the invention. Those skilled in the art, however, and familiar with the instant disclosure of the subject invention, may recognize additions, deletions, modifications, substitutions and other changes which will fall within the purview of the subject invention and claims.

What is claimed is:

1. A bag making machine operable to produce thermoplastic resin film bags, said bag making machine comprising:
   - feed means for intermittently advancing a flat tubular web of thermoplastic resin film to be formed into a thermoplastic bag, said feed means including,
     - a feed roller positioned below and extending transversely across the tubular web of thermoplastic resin film such that rotation of said feed roller advances the tubular web,
     - a pressure roller positioned above said feed roller and mutually extending transversely across the tubular web of thermoplastic resin film so that when the tubular web lies therebetween, said pressure roller passively rotates with said feed roller to advance the tubular web;
   - sealing means for applying heat to and transversely sealing together two opposing layers of a tubular web of thermoplastic resin film, said sealing means including,
     - at least one lower surface positioned beneath and extending transversely across an intended path of travel of a tubular web of thermoplastic resin film, at least one upper seal bar positioned above, mutually opposite to and in vertical alignment with said lower surface, wherein a tubular web of thermoplastic resin film may be operably fed between and subsequently come into contact with said at least one upper seal bar and said lower surface of said bag making machine, means for heating said upper seal bar to thereby induce a sealing weld bead to be formed transversely across a tubular web of thermoplastic resin film when said upper seal bar is lowered into a posture juxtaposed to but spaced from said lower stationary surface with a tubular web of thermoplastic resin film therebetween;

slitting means including a cutting edge for transversely severing a tubular web of thermoplastic resin film adjacent to and substantially parallel with a weld bead thereby dividing the tubular web of thermoplastic resin film into two portions and forming a bag of a predetermined length with a transverse seal at one end;

first drive means for controllably driving said roller means so that the tubular web of thermoplastic resin film may be advanced to a positioned suitable for sealing and slitting, said first drive means comprising a first servo motor;

second drive means for driving said sealing means and said slitting means vertically toward and away from the tubular web of thermoplastic resin film so that sealing and severing may occur, said second drive means comprising a second servo motor;

control means for controlling the operation and interaction of the components of said bag making machine so that machine operation may be optimized, said control means including, a first servo driver operable to control actuation of said first servo motor, a second servo driver operable to control actuation of said second servo motor, a first digital pack connected to said first servo driver which drives said first servo motor via said first servo driver, a second digital pack connected to said second servo driver which drives said second servo motor via said second servo driver, a sequencer connected to both said first digital pack and said second digital pack for controlling the operation of said first and said second servo motors so that when the tubular web of thermoplastic resin film is being advanced to a position suitable for the sealing and severing operation, said sealing and said cutting means are withdrawn from a position adjacent the web, and when the feed means ceases advancement of the tubular web of thermoplastic resin film, the sealing and severing operations commence, digital dimension setting means connected to said first digital pack for operably permitting variable user control of a desired length of a bag made from the flat web of thermoplastic resin film by controlling the length of the web advanced by said feed means, said timer being connected to both said second digital pack and said sequencer to control the amount of time said sealing means is engaged with said lower stationary surface, the time being a function of the thickness of the tubular web of thermoplastic resin film, so that a weld bead will be effected thereon and further the speed of web advance may be maintained, a first proximity switch for detecting an upper stop position of said sealing means and producing a signal which actuates said second servo motor so that the tubular web of thermoplastic resin film may be advanced to a position suitable for sealing and slitting while said sealing means are vertically recessed from the tubular web of thermoplastic resin film, and a second proximity switch for detecting a lower stop position of said sealing means and producing a start signal to said timer such that said sealing means will be juxtaposed with said tubular web of thermoplastic resin film the amount of time as controlled by said timer.

2. A bag making machine operable to produce thermoplastic resin film bags as defined in claim 1 wherein said at least one lower surface comprises:

a roller which lies vertically below said cutting means, extends transversely across a tubular web of thermoplastic resin film, and operably rotates about its longitudinal axis, and which is connected to said feed roller by a belt so that said roller and said feed roller may rotate in unison.

3. A bag making machine operable to produce thermoplastic resin film bags as defined in claim 2 wherein:

said slitting means and said at least one upper seal bar of said sealing means include a single knife which operably performs both the sealing and slitting functions on a web of thermoplastic resin film which is thin relative to the thickness of film necessitating separate sealing and slitting means; and said single knife is vertically disposed above the longitudinal center of said roller.

4. A bag making machine operable to produce thermoplastic resin film bags as defined in claim 1 wherein:

said sealing and said slitting means are positioned apart from each other so that radiant heat emanating from said sealing means will not adversely affect said slitting means.

5. A bag making machine operable to produce thermoplastic resin film bags as defined in claim 1 wherein said at least one lower surface comprises:

a U-shaped bar positioned beneath and extending transversely across a tubular web of thermoplastic resin film.

6. A bag making machine operable to produce thermoplastic resin film bags as defined in claim 5 wherein said at least one upper seal bar comprises:

two parallel seal bars positioned above and mutually opposite to upwardly extending legs of said U-shaped bar, such that when a tubular web of thermoplastic resin film lies between said U-shaped bar and said two parallel seal bars, said two parallel seal bars vertically reciprocate toward and away from the legs of said U-shaped bar, thereby imparting two parallel transverse weld beads to a web of thermoplastic resin film.

7. A bag making machine operable to produce thermoplastic resin film bags as defined in claim 1 and further comprising:

a first supply roller positioned in front of said feed means and under the tubular web of thermoplastic resin film which operably draws the web of thermoplastic resin film from a supply roller and advances it toward said feed means;

a second supply roller positioned vertically above and coincident with said first supply roller so that the tubular web of thermoplastic resin film lies therebetween and is advanced by said first and said second supply rollers.

8. A bag making machine operable for producing thermoplastic resin film bags as defined in claim 1 and further comprising:

a tension arm assembly positioned between said first and said second supply rollers and said feed means, said tension arm assembly including, guide rollers positioned horizontally coplanar with and parallel to each other and extending transversely below the tubular web of thermoplastic resin film, and tension rollers positioned vertically below, in between, and parallel to said guide rollers so that the tubular web operably loops through the sequence of said guide rollers and said tension rollers of said tension arm assembly, said tension rollers being operable to move vertically depending upon the tension exerted upon said tension rollers by the tubular web, the vertical position of said guide rollers controlling actuation of said supply rollers so that upon admission to said feed means, the tubular web of thermoplastic resin film will be substantially taut.

* * * * *